United States Patent
Lekon et al.

(10) Patent No.: US 11,560,035 B2
(45) Date of Patent: Jan. 24, 2023

(54) METHOD OF OPERATING AN ADJUSTABLE ROLL STABILIZER

(71) Applicant: ZF Friedrichshafen AG, Friedrichshafen (DE)

(72) Inventors: Stefan Lekon, Stemwede (DE); Lars-Theodor Thole, Lohne (DE); Axel Bolta, Friedrichshafen (DE); Michael Beller, Aitrach (DE); Mortiz Van Spankeren, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 163 days.

(21) Appl. No.: 17/003,242

(22) Filed: Aug. 26, 2020

(65) Prior Publication Data

US 2021/0061049 A1 Mar. 4, 2021

(30) Foreign Application Priority Data

Sep. 3, 2019 (DE) ..................... 10 2019 213 277.4

(51) Int. Cl.
*B60G 21/055* (2006.01)
*B60G 17/015* (2006.01)
*H02P 21/10* (2016.01)

(52) U.S. Cl.
CPC ..... *B60G 21/0555* (2013.01); *B60G 17/0157* (2013.01); *H02P 21/10* (2013.01); *B60G 2202/42* (2013.01); *B60G 2400/204* (2013.01)

(58) Field of Classification Search
CPC ............ B60G 21/0555; B60G 17/0157; B60G 2202/42; B60G 2202/135;
(Continued)

(56) References Cited

U.S. PATENT DOCUMENTS

| 6,088,637 | A | * | 7/2000 | Acker | ................ | B62D 17/00 |
|---|---|---|---|---|---|---|
| | | | | | | 280/5.506 |
| 2004/0176890 | A1 | * | 9/2004 | Acker | ................ | B60G 21/073 |
| | | | | | | 701/41 |

(Continued)

FOREIGN PATENT DOCUMENTS

| CN | 101088787 A | * 12/2007 | ......... B60G 17/0162 |
|---|---|---|---|
| DE | 10 2016 219 399 A1 | 8/2017 | |

(Continued)

*Primary Examiner* — James A English
*Assistant Examiner* — Scott F. Underwood
(74) *Attorney, Agent, or Firm* — Finch & Maloney PLLC (57) ABSTRACT

A method for operating an adjustable roll stabilizer for a motor vehicle. The adjustable roll stabilizer has an actuator which relative to a rotational axis can be rotated through a system angle in order to twist two stabilizer sections connected to it about the rotational axis relative to one another. The stabilizer sections are each coupled to a respective wheel suspension at a radial distance away from the rotational axis, and, starting from a target angle to be set at the actuator and having regard to the actual system angle and other parameters of the adjustable roll stabilizer and/or the motor vehicle equipped with it, a position-rotational speed regulator determines a target motor torque on the basis of which a motor of the actuator is controlled, so that having regard to the target angle and the actual system angle, the target motor torque is checked for plausibility.

9 Claims, 4 Drawing Sheets

(58) Field of Classification Search
CPC .......... B60G 2400/204; B60G 2400/98; B60G 2400/252; B60G 2400/20; B60G 2204/4191; B60G 2800/012; H02P 21/10; H02P 6/16; H02P 6/08
See application file for complete search history.

(56) References Cited

U.S. PATENT DOCUMENTS

| | | | | |
|---|---|---|---|---|
| 2005/0264247 A1* | 12/2005 | Buma | ................ | B60G 21/0555 |
| | | | | 318/432 |
| 2007/0040521 A1* | 2/2007 | Yamada | .................... | H02P 6/16 |
| | | | | 318/275 |
| 2009/0091094 A1* | 4/2009 | Sano | .................. | B60G 17/0162 |
| | | | | 280/5.511 |
| 2009/0224493 A1* | 9/2009 | Buma | ................ | B60G 17/0162 |
| | | | | 280/5.511 |
| 2015/0094909 A1* | 4/2015 | Illg | .................... | B60G 17/0162 |
| | | | | 701/37 |
| 2017/0008366 A1* | 1/2017 | Füssl | ................. | B60G 21/0556 |

FOREIGN PATENT DOCUMENTS

| | | | | |
|---|---|---|---|---|
| DE | 102016215004 A1 * | 2/2018 | ............. | B60G 13/02 |
| EP | 1 362 720 A2 | 11/2003 | | |
| EP | 1705038 A1 * | 9/2006 | ......... | B60G 17/0162 |
| JP | 2008265565 A * | 11/2008 | | |

\* cited by examiner

METHOD OF OPERATING AN ADJUSTABLE ROLL STABILIZER

This application claims priority from German patent application serial no. 10 2019 213 277.4 filed Sep. 3, 2019.

FIELD OF THE INVENTION

The invention relates to a method of operating an adjustable roll stabilizer for a motor vehicle and to a system for roll stabilization.

BACKGROUND OF THE INVENTION

From automotive technology, in particular chassis technology, it is known to influence the roll or rolling behavior of motor vehicles by means of so-termed roll stabilizers. In such cases the basic structure consists of an essentially C-shaped torsion bar spring which, in its central area, is mounted rotatably relative to the vehicle body and whose outer, opposite ends are in each case coupled to a wheel suspension by means of coupling elements termed hinged supports. By virtue of this design the roll stabilizer ensures that when driving round a curve, the body of the vehicle is deflected not only on the outside of the curve (due to the centrifugal force), but also that the wheel on the inside of the curve is somewhat lowered. Roll stabilizers improve the track-keeping of the vehicle and reduce the lateral inclination of the vehicle body (rolling), which makes driving round curves safer and more comfortable.

To further increase vehicle stability and driving comfort, it is known to make such roll stabilizers adjustable. In that case the roll stabilizer comprises an actuator and is divided into two stabilizer sections that, with the help of the actuator, can twist relative to one another about a rotational axis. By rotating the stabilizer sections relative to one another, rolling movement of the vehicle body is produced in a controlled manner or rolling movement of the vehicle body caused by external influences is selectively counteracted. From the prior art adjustable roll stabilizers are known, whose actuator comprises an electric motor which is in driving connection with a mechanical gear system, particularly in the form of a multi-step planetary gearset, in order to produce suitable rotational speeds and torques. In this connection reference should be made, for example, to DE 10 2016 219 399 A1.

Besides the design of an adjustable roll stabilizer, its appropriate control also poses a technical challenge.

During operational use in a vehicle the actuator of an adjustable roll stabilizer, including its electric motor, is operated in both running directions in order to fulfill its functions as described above. According to one possible design a position-rotational speed regulator can be provided, which among other things depending on a desired angle to be set, determines a nominal motor torque on the basis of which the electric motor of the actuator is controlled. Corresponding to the previously described use of an adjustable roll stabilizer, the nominal motor torque determined by the position-rotational speed regulator can act in each of the two possible rotational directions, depending on the operating condition.

Within the adjustable roll stabilizer, particularly in the stabilizer sections, depending on the operating condition, mechanical energy (kinetic energy or potential energy produced by deformation) can be stored. During positioning operation of the actuator, on the basis of a set-point motor torque determined by the position-rotational speed regulator—starting from a set-point angle to be set—, due to the stored mechanical energy in the adjustable roll stabilizer more or less marked overshoots in relation to an actual motor position compared with a set-point motor position can occur. In other words, the mechanical energy stored within the adjustable roll stabilizer in certain operating conditions is then transmitted by the mechanical coupling (gear system) to the motor of the actuator. During the control of the motor it can then occur that instead of a steady approach of the actual motor position to the set-point motor position, the actual motor position "overshoots" the set-point motor position. Then—departing from an otherwise usual regulation principle—it is expedient to slow down the motor of the actuator already before its set-point motor position has been reached, i.e. to produce a set-point motor torque in the opposite direction. For that purpose the motor of an adjustable roll stabilizer—depending on the operating condition—has to be operated not only in a driving mode in both rotational directions, but also in a decelerating (braking) mode in both rotational directions, i.e. in a so-termed four-quadrant operating mode.

A comparable braking behavior can be necessary in the event that, for example due to bumpiness of the road, external forces are transmitted from the wheel connection points to the adjustable roll stabilizer, if the force acting on the motor from outside produces a torque in the correct direction for reducing the existing control deviation.

SUMMARY OF THE INVENTION

An objective of the present invention is to indicate a method of operating an adjustable roll stabilizer, in which, in the context of the position-rotational speed regulation, the possibility is provided of being able to operate the motor of the actuator in both rotational directions reliably in both the driving mode and the deceleration mode (four-quadrant operation). In addition a corresponding system for roll stabilization should be indicated.

First, this objective is achieved by a method having the features specified in the independent claim(s), This is a method for operating an adjustable roll stabilizer for a motor vehicle. wherein the adjustable roll stabilizer comprises an actuator which can rotate through a system angle relative to a rotational axis in order thereby to twist two stabilizer sections connected thereto relative to one another about the rotational axis. In this case the stabilizer sections are radially a distance away from the rotational axis and each is coupled to a respective wheel suspension. Starting from a set-point angle to be set at the actuator and with regard to the actual system angle at the time, as well as other parameters of the roll stabilizer and/or of the motor vehicle in which the roll stabilizer is fitted, a position-rotational speed regulator determines a target motor torque on the basis of which a motor of the actuator is controlled. According to the invention, with regard to the set-point angle and the actual system angle, a check of the target motor torque for plausibility is carried out.

According to the invention, it is first recognized that within an adjustable roll stabilizer, due to stored mechanical energy, particularly in the stabilizer sections due to their mechanical coupling, overshooting of the actuator motor can take place. Besides, due to the introduction of external forces for example caused by bumpiness of the road, a reaction on the actuator motor can be produced, and in both cases (overshooting and external force introduction alike) it is expedient to operate the motor in a decelerating mode. According to the invention, for that purpose a check of the target motor torque determined by the position-rotational speed regulator for plausibility, with regard to the target angle and the actual system angle, is proposed.

Advantageously, the plausibility check is carried out with reference to a consideration of the control deviation between the target angle and the system angle. In the context of the invention, the target angle is understood to mean the system angle to be set at the actuator. Thus, it is the angle through which the two stabilizer sections connected to the actuator should be twisted about the rotational axis relative to one another. The target angle can for example be specified by a previously stored control instance.

For a desired four-quadrant operation of the actuator, it is expedient to carry out a plausibility check of the target torque determined by the position-rotational speed regulator. Advantageously, this is done with reference to at least two criteria, namely whether:

the control deviation between the target angle and the system angle is increased, and the target motor torque is in a direction that would increase the control deviation, and if both criteria are fulfilled the plausibility check is deemed negative. In other words, when there is an operating condition in which both the control deviation between the target angle and the system angle is large and the target motor torque is in a direction which would increase the control deviation, the target motor torque determined by the position-rotational speed regulator is not plausible.

In addition or alternatively, according to an advantageous design of the method the plausibility check is deemed to be positive at least if the target motor torque contributes toward a reduction of the control deviation between the target angle and the actual system angle.

Basically, the proposed plausibility check can be carried out during the on-going operation of the adjustable roll stabilizer. An expedient further development of the method, however, provides that the above-described plausibility check is only carried out when an in particular parameterizable threshold of the target motor torque and/or of the control deviation is exceeded.

According to the invention, the position-rotational speed regulator determines the target motor torque starting from a target angle to be set at the actuator and having regard to the actual system angle and further parameters of the roll stabilizer and/or the motor vehicle equipped with it. It is expedient that at least one of the further parameters taken into account is the vehicle speed of the motor vehicle equipped with the adjustable roll stabilizer.

The motor of the actuator is controlled on the basis of the target motor torque determined by the position-rotational speed regulator. Advantageously, this takes place in that the target motor torque determined for the actuator is fed into a field-orientated regulator, which in turn controls a motor associated with the actuator.

As already described, the target angle to be set at the actuator is entered as an input magnitude into the position-rotational speed regulator used for the method. According to an advantageous design of the method, this is determined having regard to a guide magnitude and a perturbation-compensating magnitude. Expediently, that takes place in an upstream regulator instance.

An advantageous design of the method provides that the guide magnitude is a rotational angle for a vehicle-side torque demand (in particular determined by multiplying by the reciprocal of the system rigidity). The perturbation-compensating magnitude is preferably a zero-torque angle (actuator angle at which, with regard to the current wheel height levels, there is no actuator torque), and the rotational angle for the torque demand and the zero-torque angle are added to the target angle to be set at the actuator.

In addition the objective mentioned at the beginning is achieved by a roll stabilization system according to independent claim(s). This is a system for roll stabilization which is designed to carry out a method of the type described above.

BRIEF DESCRIPTION OF THE DRAWINGS

Below, the invention is explained in greater detail with reference to drawings. From these, further advantageous features of the invention will also emerge. The drawings show.

DETAILED DESCRIPTION OF THE PREFERRED EMBODIMENTS

Figure 1:
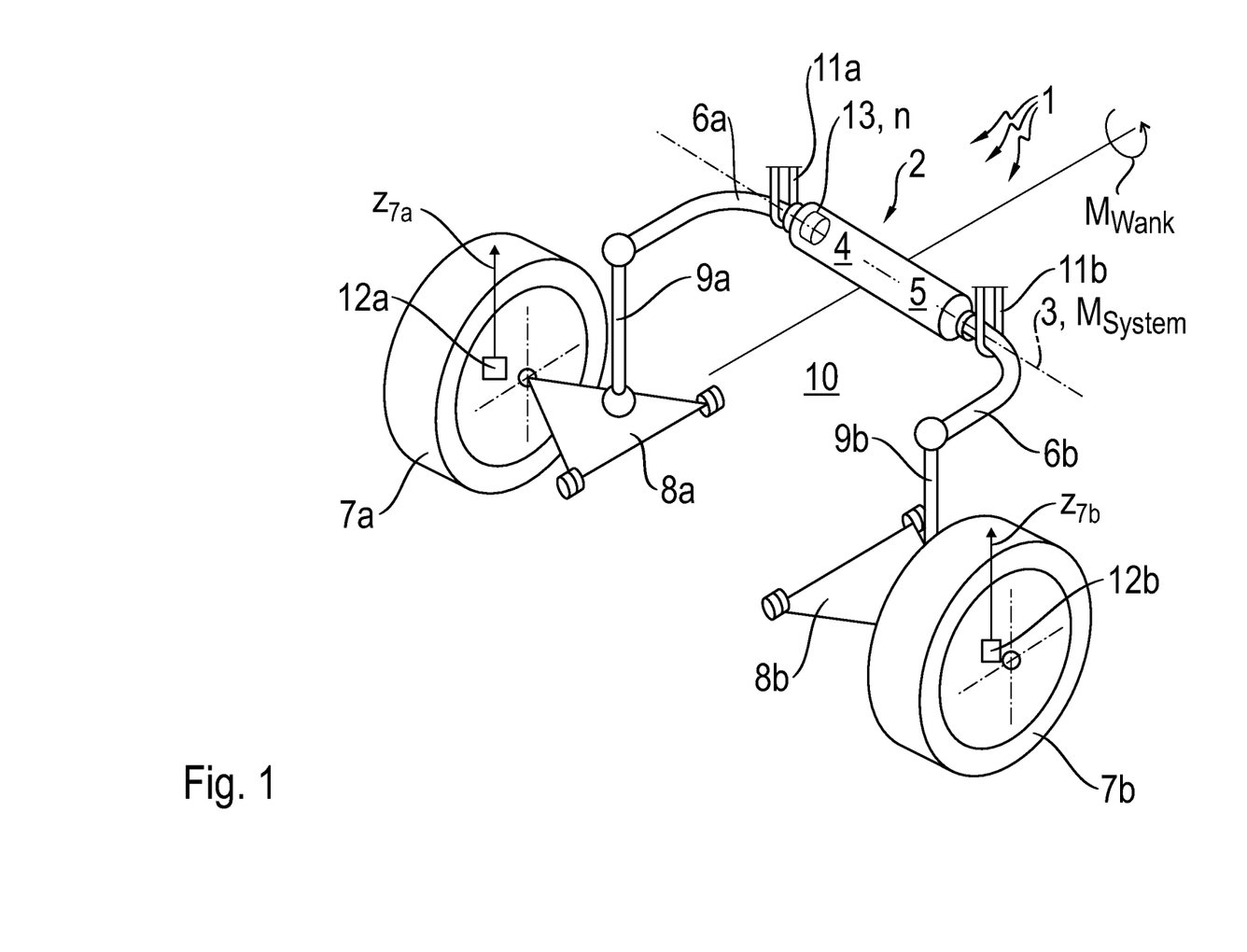
FIG. 1: An adjustable roll stabilizer for a motor vehicle, represented schematically.

To clarify the field of use of the invention, FIG. 1 first shows a schematic representation of an adjustable roll stabilizer 1. The adjustable roll stabilizer 1 is part of an incompletely illustrated chassis of a motor vehicle (not shown). Of the motor vehicle a vehicle body 10 is only suggested by an index. The roll stabilizer 1 is also part of an axle of the motor vehicle, for example the front axle and/or the rear axle of the motor vehicle can be fitted with the adjustable roll stabilizer.

As shown in FIG. 1, a wheel 7a on the left and a wheel 7b arranged on the right, on the opposite side of the vehicle, are connected to the body 10 of the vehicle by means of control arm arrangements 8a and 8b respectively, which need no more detailed explanation. Thus, the wheel 7a and control arm arrangement 8a and the wheel 7b and control arm arrangement 8b, respectively, each form a unit and are each coupled by a hinged support 9a and 9b to a respective end of an associated stabilizer section 6a and 6b of the adjustable roll stabilizer 1. The stabilizer section 6a on the left and the stabilizer section 6b on the right are connected to one another in the middle of the vehicle by an actuator 2 shown as an essentially cylindrical body.

In a manner known as such, the adjustable roll stabilizer 1 is mounted so that it can rotate relative to the vehicle body 10 about a rotational axis 3, for which purpose a stabilizer mounting 11a on the left and a stabilizer mounting 11b on the right are provided, which mountings, as shown in FIG. 1, surround areas of the respective stabilizer sections 6a and 6b in a U-shape—illustrated in a simplified manner.

The actuator 2 represented here as a cylindrical body 2 comprises a housing (not indexed) which is essentially rotationally symmetrical relative to the rotational axis 3 and in which an electric motor 4, a multi-step planetary gearset 5 and a rotational speed sensor 13 (each indicated only by indexes) are arranged. By way of the electric motor 4 and the multi-step planetary gearset 5 the stabilizer sections 6a and 6b are in driving connection with one another. When the actuator 2 is inactive, the two stabilizer sections 6a, 6b are connected solidly to one another by way of the inactive electric motor 4 and the multi-step planetary gearset 5 in driving connection with it. By operating the electric motor 4, however, and depending on the rotational direction of the electric motor 4 about the rotational axis 3, the stabilizer sections 6a, 6b can be twisted relative to one another. During this the multi-step planetary gearset 5 produces a fixed rotational speed ratio between the drive input (electric motor 4) and the drive output (stabilizer section 6b on the right, which is coupled to the output of the gearset). In that way the adjustable roll stabilizer 1 can be adjusted in a manner known as such.

Depending on the operating condition of the adjustable roll stabilizer 1 or the vehicle equipped with it, a torsion can be produced between the stabilizer sections 6a, 6b coupled to one another by the actuator 2, depending on which a torque $M_{System}$ acting about the rotational axis 3 is developed. That torque $M_{System}$ is applied at the actuator 2 in the form of a system torque.

With the help of the roll stabilizer 1 a roll torque $M_{Wank}$ can be supported, which acts between the vehicle body 10 and the wheels 7a, 7b. By adjusting the roll stabilizer 1 the supportable roll torque $M_{Wank}$ can be influenced. To regulate the roll stabilizer 1 according to need, respective height level sensors 12a and 12b are associated with the left-hand wheel 7a and the right-hand wheel 7b, which sensors enable a detection of wheel stroke movements of the wheel concerned and which emit these in the form of a height level $z7a$ for the left-hand wheel and a height level $z7b$ for the right-hand wheel. In addition, by way of the rotational speed sensor 13, rotation of the electric motor 4 can be determined and this is emitted in the form of a rotational speed signal as a motor rotational speed n.

Below, the regulation of the adjustable roll stabilizer 1 shown schematically in FIG. 1 is explained in greater detail with reference to the regulation strategy shown in FIG. 2. According to this, a so-termed target system torque is adopted as an input magnitude for the regulation of the adjustable roll stabilizer 1. This is a magnitude specified for the vehicle, which corresponds to the torque $M_{System}$ acting about the rotational axis 3 (see FIG. 1) that should be supported by the adjustable roll stabilizer 1 at the level of the actuator, i.e. which engages at the actuator 2—comprising the electric motor 4 and the gearset 5—with the correct rotational direction about the rotational axis 3. Thus, by virtue of the combined kinematic action of the adjustable roll stabilizer 1, the wheel suspensions 7a, 7b, 8a, 8b, 9a, 9b and the connections 11a, 11b upon the vehicle body 10, the adjustable roll stabilizer 1 supports—at the vehicle level—an axle-related roll torque $M_{Wank}$ (see FIG. 1, orientated in the longitudinal direction of the vehicle).

The target system torque is converted by way of a known system rigidity into a rotation angle for the torque demand, wherein the known system rigidity is composed of individual rigidities, in particular the rigidity of the stabilizer itself (stabilizer sections, gearset, housing, decoupling elements if present, hinged supports, stabilizer mountings and the like). In parallel, the regulation of the adjustable roll stabilizer adopts a magnitude for the compensation of perturbations. For this, wheel movement data are detected by the height level sensors associated with the wheels, in the form of height level signals (for individual wheels) and a table of characteristic values for a decoupling angle (with previously determined vehicle-specific data) for determining a so-termed "zero-torque angle" is used, i.e. that angle which corresponds to the outermost rotation angle of the adjustable roll stabilizer, perhaps caused by an uneven road, and which would put the actuator of the adjustable roll stabilizer in a torque-free position. The two angles determined in this way, namely the rotation angle for the torque demand and the zero-torque angle, are then added to a target angle.

The target angle is then fed into a cascading position-rotational speed regulator. This comprises a position regulator which from the incoming target angle—and also having regard to a feedback signal from the motor—determines a target rotational speed, which in turn is passed to a rotational speed regulator. On the basis of the target rotational speed and feedback from the electric motor (rotational speed), the rotational speed regulator determines a target motor torque for controlling the electric motor. The target motor torque is in turn fed into a field-orientated regulator which—again having regard to feedback signals from the electric motor—controls the electric motor 4 of the actuator 2. A motor output torque produced by the electric motor 4 is transformed—now mechanically—by way of a gear system 5 (multi-step planetary gearset) into a system torque, which acts between the stabilizer sections (see FIG. 1, indexes 6a and 6b).

Figure 2:
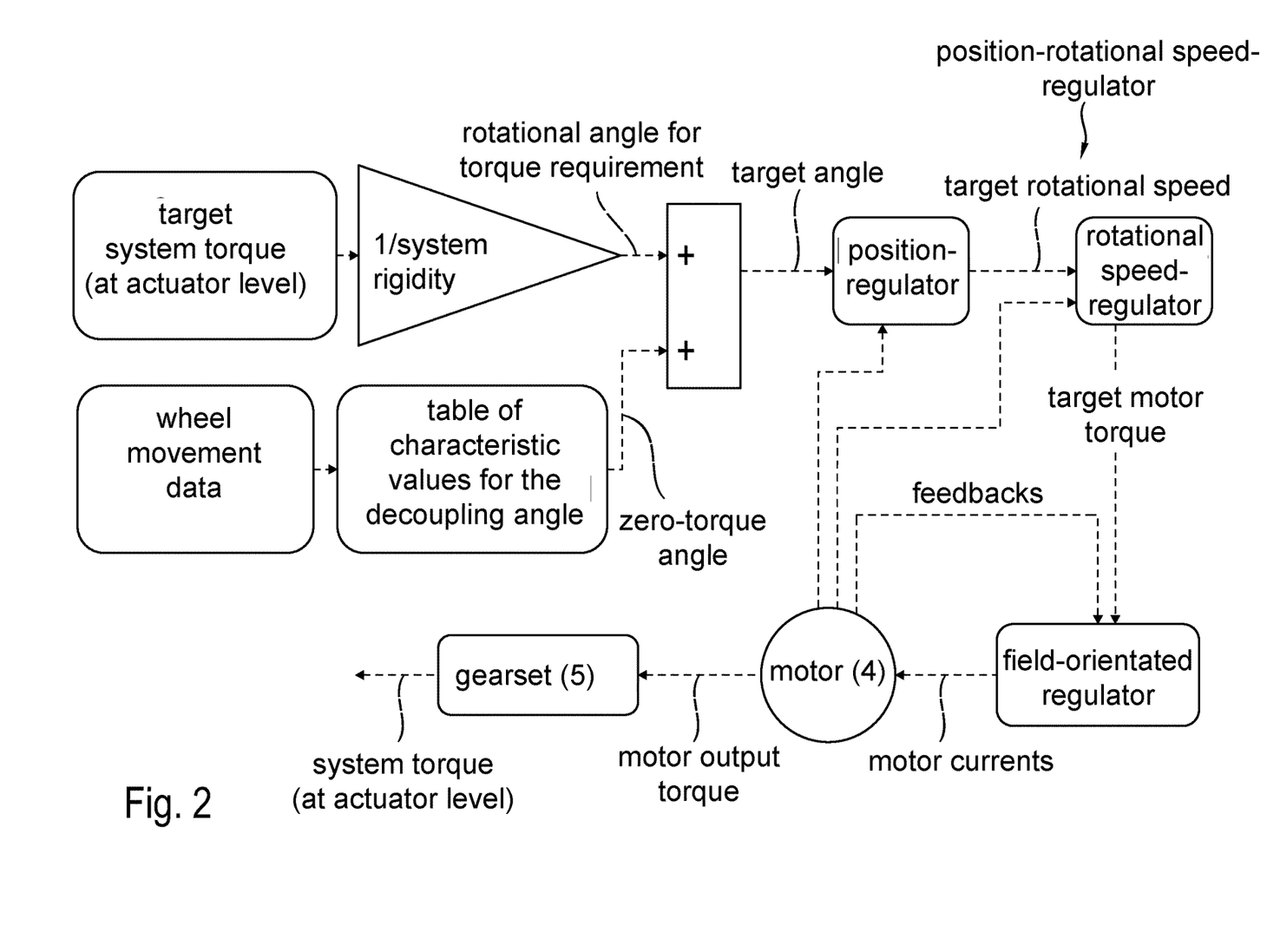
FIG. 2: A graphical representation of a control strategy for an adjustable roll stabilizer.

The regulation scheme shown in FIG. 2 is advantageously used with an adjustable roll stabilizer 1 of the type shown in FIG. 1. With the regulation principle described therein, an incoming system target torque is converted via the system rigidity into a target angle from which, by means of a position-rotational speed regulator, a target motor torque is determined, whereby the motor is acted upon with corresponding motor currents.

Figure 3:
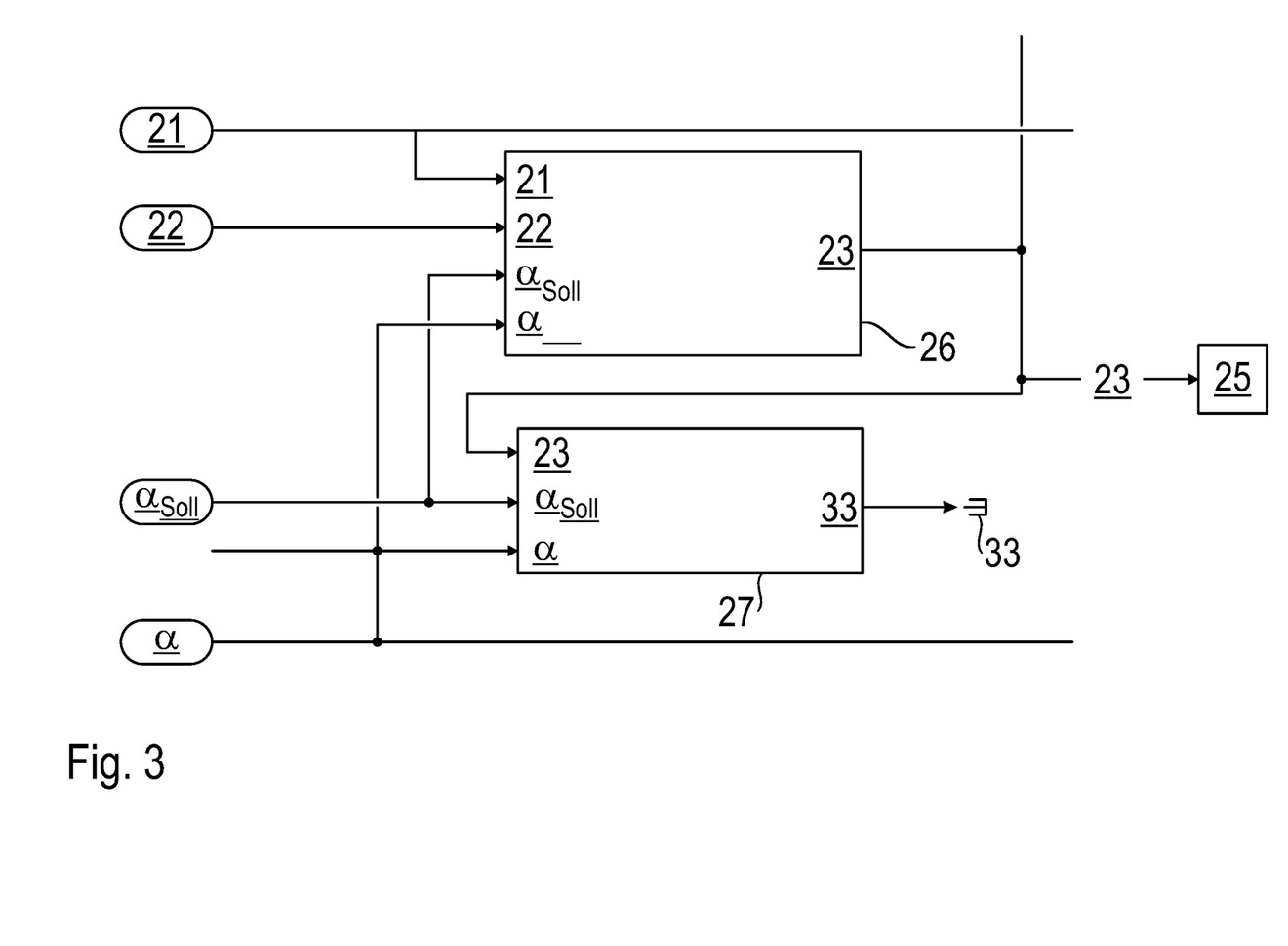
FIG. 3: A schematic representation of a position-rotational speed regulator and a schematic representation of a plausibility check function.

For the further clarification of the invention reference should now be made to FIG. 3. This shows a schematic representation of a position-rotational speed regulator and a schematic representation of a plausibility check function. The position-rotational speed regulator, therein shown as a rectangle indexed 26 for a position-rotational speed cascade (PRSC), is advantageously used within a control strategy of an adjustable roll stabilizer as explained with reference to FIG. 2. Besides the position-rotational speed cascade 26, FIG. 3 shows schematically a quadrant monitoring process 27 of the position-rotational speed cascade, also shown as a rectangle (indexed 27).

Various input signals are fed into the position-rotational speed cascade 26, which are processed to generate an output signal in the form of a target motor torque 23. The target motor torque 23 is the output magnitude of the position-rotational speed regulator. The outgoing target motor torque 23 is—as already explained with reference to FIG. 2—fed into a field-orientated regulator 25, whereby ultimately the control of the actuator motor can take place.

As input magnitudes of the position-rotational speed cascade 26 the following can be mentioned: the system angle $\alpha$ (actual actuator angle, or "actual angle"), the target angle $\alpha_{Soll}$ (actuator angle to be set), a vehicle speed 22 (of the motor vehicle equipped with the roll stabilizer 1), and if appropriate further parameters 21 (such as a steering angle of the motor vehicle or the like). The basic function of the position-rotational speed cascade 26 shown, starting from a target angle $\alpha_{Soll}$ to be set at the actuator and having regard to the actual system angle $\alpha$ and other parameters of the motor vehicle such as the vehicle speed 22 and, for example, the steering angle, consists in determining the target motor torque 23 on the basis of which the motor of the actuator can be controlled.

In certain operating situations it may be necessary to slow down the motor of the actuator. Such a situation can for example arise if owing to stored mechanical energy in the adjustable roll stabilizer, particularly in the stabilizer sections, an actual motor position overshoots the target motor position. In such a case it is expedient to brake the motor already before the target motor position is reached, i.e. to produce a target motor torque in the opposite direction. In addition it is also possible due to the introduction of external forces, for example caused by bumpiness of the road, from the wheel attachment points to the adjustable roll stabilizer, that braking is necessary, namely when the action of such external forces produces a torque in the correct direction for reducing the control deviation. By means of a quadrant monitoring process 27 it can be checked whether a target motor torque 23 determined by the position-rotational speed regulator seems plausible, particularly having regard to operating situations described earlier.

As input magnitudes entered into the quadrant monitoring process 27 are the target motor torque 23, the system angle $\alpha$ and the target angle $\alpha_{Soll}$, as indicated by the arrows in FIG. 3. In a manner still to be described, a check of the target motor torque 23 for plausibility is carried out having regard to the target angle $\alpha_{Soll}$ and the actual system angle $\alpha$.

This is explained in detail with reference to FIG. 4, which shows a graphical representation of a plausibility checking scheme according to a preferred example embodiment of the invention. In the area on the left of FIG. 4 the input magnitudes for the quadrant monitoring are shown, i.e. the target angle $\alpha_{Soll}$, the system angle $\alpha$ and the target motor torque 23 (see the quadrant monitoring process 27 in FIG. 3). For the plausibility check described by the invention the control deviation 24 between the target angle $\alpha_{Soll}$ and the system angle $\alpha$ is considered. For this purpose a difference between these two input magnitudes is formed first, which enters into the further plausibility check in the form of a control deviation 24.

The plausibility check is essentially based on three branches. In the topmost branch—referring to FIG. 4—it is determined whether an existing control deviation (between the target angle and the system angle) is becoming larger. In a branch under that one it is determined whether the target motor torque 23 is in a wrong direction, i.e. one that increases the control deviation 24. And finally, in a lowest branch it is checked whether the motor torque 23 exceeds a threshold required for the initiation of the plausibility check.

Figure 4:
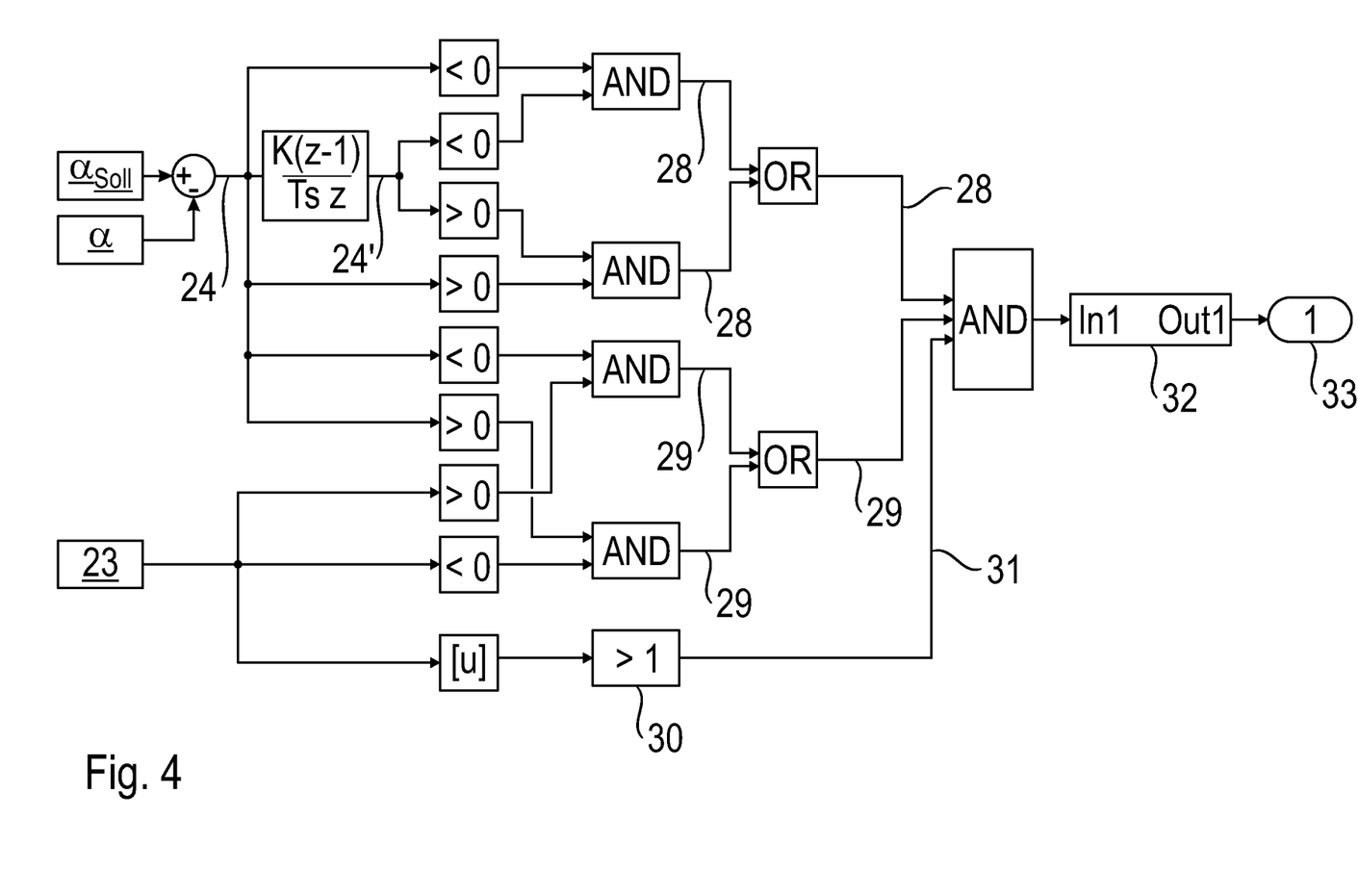
FIG. 4: A graphical representation of a plausibility check scheme, according to an example embodiment of the invention.

As can be seen in the area on the right in FIG. 4, the three branches are logically connected by an AND link. Only if all three of the criteria examined in the branches are fulfilled is the AND condition satisfied and with time-related debouncing 32, finally emitted as an error 33. Thus, the plausibility check (only) fails in the form of an error 33 when the target motor torque 23 exceeds a minimum threshold value, the control deviation is increasing, and at the same time the motor torque moves in the wrong direction, i.e. the direction that increases the control deviation.

For the topmost branch (the check whether the control deviation is becoming larger), the control difference 24 is first derived according to time and is therefore available as the derivative 24' of the control difference. Alternatively, to achieve a high level of robustness the derivative of the actual position is formed and used (in the sense "is the actual position moving in the direction of the target position?"). As the next step, the signs of the derivative 24' of the control difference (or derivative of the actual position) and in parallel of the control difference 24 are checked. By way of the respective AND links, the presence of two operating situations is queried: in a first case it is questioned whether at the same time the derivative 24' of the control difference is negative and the control difference 24 is negative. Alternatively it is questioned whether the derivative 24' of the control difference and at the same time the control difference 24 are both positive. In each of the cases the fulfillment of the AND condition is interpreted as the result that the control difference is becoming larger, which is emitted via an OR link as a signal indexed 28.

In the central branch it is checked whether the target motor torque 23 is moving in the wrong direction. That check takes place on the basis of the incoming control difference 24 and the target motor torque 23. Specifically, for this it is checked whether either the control difference 24 is negative and the target motor torque 23 is positive or whether, conversely, the control difference 24 is positive and the target motor torque 23 is negative. If one of these two cases applies, then the signal indexed 29 is produced, according to which the target motor torque 23 is acting in a direction that increases the control difference 24.

In the lowest branch, as already mentioned, it is checked whether the target motor torque 23 exceeds a minimum threshold.

Only when all three of the criteria checked in the respective branches are fulfilled is, finally an error 33 declared with time-related debouncing 32, whereupon the plausibility check is deemed negative. If at least one of the criteria is not fulfilled, the target motor torque is deemed to be plausible. To further increase the robustness of the plausibility check it is conceivable, in addition to the three criteria, also to query a threshold value of the control deviation as an AND link.

INDEXES

1 Adjustable roll stabilizer
2 Actuator
3 Rotational axis
4 Electric motor
5 Multi-step planetary gearset
6a, 6b Left-hand (or right-hand) stabilizer section
7a, 7b Left-hand (or right-hand) wheel
8a, 8b Left-hand (or right-hand) control arm arrangement
9a, 9b Left-hand (or right-hand) hinged support
10 Vehicle body
11a, 11b Left-hand (or right-hand) stabilizer mounting
12a, 12b Height level sensor for the left-hand (or right-hand) wheel
13 Rotational speed sensor
21 Various other parameters
22 Vehicle speed
23 Target motor torque
24 Control difference
24' Derivative of control difference
25 Field-orientated regulation
26 Position-rotational speed cascade (PRSC)—Level 1
27 Quadrant monitoring of the position-rotational speed cascade—Level 2
28 The control difference is increasing
29 Target motor torque is in a direction that increases the control difference
30 Threshold value for starting the monitoring of the target motor torque
31 Target motor torque is above the filtering threshold
32 Time-related debouncing buffer
33 Error
z7a, z7b Height level of the left-hand (or right-hand) wheel
$M_{Wank}$ Roll torque (axle-related)
$M_{System}$ System torque
n Motor rotational speed
$\alpha$ System angle
$\alpha_{Soll}$ Target angle (system)

The invention claimed is:

1. A method of operating an adjustable roll stabilizer for a motor vehicle, the adjustable roll stabilizer having an actuator which is rotatable relative to a rotational axis through an actual system angle in order to twist two stabilizer sections connected to the actuator about the rotational axis relative to one another, the two stabilizer sections are each coupled to a respective wheel suspension at a radial distance away from the rotational axis, the method comprising:
   starting from a target angle to be set at the actuator and having regard to the actual system angle and further parameters of at least one of the adjustable roll stabilizer and the motor vehicle equipped with the adjustable roll stabilizer, determining a target motor torque, with a position-rotational speed regulator, on a basis of which a motor of the actuator is controlled,
   having regard to the target angle and the actual system angle, checking the target motor torque for plausibility,
   taking into account, for the plausibility check, a control difference between the target angle and the actual system angle,
   carrying out the plausibility check with reference to at least two criteria comprising:
      the control difference between the target angle and the actual system angle is increasing, and
      the target motor torque is in a direction such as to increase the control difference; and
   deeming the plausibility check as negative when both of the two criteria are fulfilled.

2. The method according to claim 1, further comprising deeming the plausibility check as positive when at least the target motor torque contributes toward reducing the control difference between the target angle and the actual system angle.

3. The method according to claim 1, further comprising carrying out the plausibility check only when at least one of a threshold value of the target motor torque and the control difference is exceeded.

4. The method according to claim 1, further comprising taking into account, as the further parameter, a vehicle speed of the motor vehicle equipped with the adjustable roll stabilizer.

5. The method according to claim 1, further comprising feeding the target motor torque, determined for the actuator, into a field-orientated controller which controls the motor of the actuator.

6. The method according to claim 1, further comprising determining the target angle to be set at the actuator having regard to a guide magnitude and a perturbation-compensating magnitude.

7. The method according to claim 6, further comprising defining the guide magnitude as a rotation angle for a vehicle-side torque demand, and the perturbation-compensating magnitude is a zero-torque angle, and adding the rotation angle for the torque demand and the zero-torque angle to the target angle to be set at the actuator.

8. A system for roll stabilization of a motor vehicle, the system comprising a roll stabilizer which is designed to be adjustable, the adjustable roll stabilizer has an actuator which is rotatable relative to a rotational axis through an actual system angle in order to twist two stabilizer sections connected to the actuator about the rotational axis relative to one another, the two stabilizer sections are each coupled to a respective wheel suspension at a radial distance away from the rotational axis,
   wherein, starting from a target angle to be set at the actuator and having regard to the actual system angle and other parameters of at least one of the adjustable roll stabilizer and the motor vehicle equipped with the adjustable roll stabilizer, a position-rotational speed regulator determines a target motor torque on a basis of which a motor of the actuator is controlled, and having regard to the target angle and the actual system angle, the target motor torque is checked for plausibility,
   the position-rotational speed regulator taking into account, for the plausibility check, a control difference between the target angle and the actual system angle,
   the position-rotational speed regulator carrying out the plausibility check with reference to at least two criteria comprising:
      the control difference between the target angle and the actual system angle is increasing, and
      the target motor torque is in a direction such as to increase the control difference; and
   the position-rotational speed regulator considering the plausibility check as negative when both of the two criteria are fulfilled.

9. A method of operating an adjustable roll stabilizer for a motor vehicle, the adjustable roll stabilizer having an actuator which defines a rotational axis, the actuator is connected to two stabilizer sections, and each of the two stabilizer sections is coupled to a respective wheel suspension at a radial distance away from the rotational axis, the method comprising:
   rotating the actuator through an actual system angle relative to the rotational axis to twist the two stabilizer sections relative to each other about the rotational axis;
   setting a target angle at the actuator;
   determining a target motor torque, with a position-rotational speed regulator, from the target angle and based on the actual system angle and other parameters of at least one of the adjustable roll stabilizer and the motor vehicle;
   controlling a motor of the actuator based on the target motor torque;
   checking a plausibility of the target motor torque based on the target angle and the actual system angle;
   taking into account, for the plausibility check, a control difference between the target angle and the actual system angle;
   carrying out the plausibility check with reference to at least two criteria comprising:
      the control difference between the target angle and the actual system angle is increasing, and
      the target motor torque is in a direction such as to increase the control difference; and
   deeming the plausibility check as negative when both of the two criteria are fulfilled.

* * * * *